United States Patent
Kumar et al.

(10) Patent No.: US 9,740,894 B1
(45) Date of Patent: Aug. 22, 2017

(54) SILENT RFID STATE AND RESTORE BACK

(71) Applicant: Motorola Mobility LLC, Chicago, IL (US)

(72) Inventors: Jatinder Kumar, Coral Springs, FL (US); Hong Zhao, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/180,869

(22) Filed: Jun. 13, 2016

(51) Int. Cl.
*H04Q 5/22* (2006.01)
*G06K 7/10* (2006.01)
*G06K 19/07* (2006.01)
*G06K 19/073* (2006.01)
*G06K 19/077* (2006.01)

(52) U.S. Cl.
CPC ..... *G06K 7/10198* (2013.01); *G06K 19/0723* (2013.01); *G06K 19/0728* (2013.01); *G06K 19/07336* (2013.01); *G06K 19/07788* (2013.01)

(58) Field of Classification Search
CPC .......... G06K 7/10198; G06K 19/0723; G06K 19/0728; G06K 19/07336; G06K 19/07788; Y02B 60/50; Y02B 60/1282
USPC .............. 340/10.1, 10.33, 10.34, 10.5, 572.1
See application file for complete search history.

(56) References Cited

U.S. PATENT DOCUMENTS

| | | | | |
|---|---|---|---|---|
| 5,467,081 A * | 11/1995 | Drews | ................. | G06K 7/0008 340/10.51 |
| 6,104,333 A * | 8/2000 | Wood, Jr. | ............... | G01S 13/765 340/10.4 |
| 7,082,344 B2 * | 7/2006 | Ghaffari | ................. | G05B 19/00 235/385 |
| 8,458,483 B1 * | 6/2013 | Bailey | .................... | G06F 21/35 340/10.1 |
| 8,710,954 B2 * | 4/2014 | Greenlee | ............ | G06K 19/0723 340/10.5 |
| 2005/0237160 A1 * | 10/2005 | Nolan | ................. | G06K 19/0705 340/10.33 |
| 2006/0033608 A1 * | 2/2006 | Juels | ................ | G06K 19/07336 340/10.1 |
| 2006/0289641 A1 * | 12/2006 | Roesner | ............. | G06K 19/0723 235/435 |
| 2007/0069852 A1 * | 3/2007 | Mo | ........................ | H04L 9/3271 340/5.1 |
| 2007/0273484 A1 * | 11/2007 | Cederlof | ........... | H04W 52/0225 340/10.33 |
| 2008/0106385 A1 * | 5/2008 | Kelley | .................... | G06Q 30/06 340/10.5 |
| 2008/0136603 A1 * | 6/2008 | Choi | .................. | G06K 19/0723 340/10.33 |

(Continued)

OTHER PUBLICATIONS

"EPC Radio-Frequency Identity Protocols Class-1 Generation-2 UHF RFID Protocol for Communications at 860 MHz-960 MHz Version 1.2.0", Oct. 23, 2008, 108 pages.

*Primary Examiner* — Firmin Backer
*Assistant Examiner* — Adnan Aziz (57) ABSTRACT

Silent radio frequency identifier (RFID) state and restore back is described herein. An RFID tag enters a silent state by receiving a sleep command from an RFID reader. While the RFID tag is in the silent state, only an awake command will restore back normal operation of the RFID tag. Other received commands or interrogations from the RFID reader are ignored and responses are not transmitted to the RFID reader.

20 Claims, 7 Drawing Sheets

(56) References Cited

U.S. PATENT DOCUMENTS

| | | | |
|---|---|---|---|
| 2009/0140860 A1* | 6/2009 | Forster | G06K 19/0723 340/572.1 |
| 2010/0060432 A1* | 3/2010 | van Niekerk | G06K 7/0008 340/10.3 |
| 2010/0277287 A1* | 11/2010 | Choi | H04L 9/3273 340/10.42 |
| 2011/0063084 A1* | 3/2011 | Ryoo | G06K 7/0008 340/10.1 |
| 2011/0128129 A1* | 6/2011 | Graczyk | G06K 17/0022 340/10.33 |
| 2011/0291803 A1* | 12/2011 | Bajic | G08B 13/2462 340/10.1 |

\* cited by examiner

SILENT RFID STATE AND RESTORE BACK

BACKGROUND

Retail items, such as portable devices, electronic devices, clothing, and other types of consumer goods can use a tag for point of sale systems to allow a customer to bring the retail items to a cashier that scans each of the tags to complete the sale of the retail items. A radio frequency identification (RFID) tag can also be used as an anti-theft device. For instance, RFID readers are placed near exits of the retail store, and an alarm is triggered when any items that exit the retail store have an active or operating RFID tag. When a shopper purchases a retail item, an RFID reader at checkout sends a command to kill the RFID tag that permanently disables the device so the RFID tag is no longer detected by the RFID readers near the exits of the retail store.

BRIEF DESCRIPTION OF THE DRAWINGS

Embodiments of silent RFID state and restore back are described with reference to the following Figures. The same numbers may be used throughout to reference like features and components that are shown in the Figures.

DETAILED DESCRIPTION

Embodiments of silent radio-frequency identification (RFID) state and restore back are described herein. An RFID tag supports different states, including a standard state (e.g., a regular or normal state), and a silent state. The RFID tag also supports a sleep command to put the RFID tag into the silent state, and an awake command to restore back normal operation of the RFID tag from the silent state (e.g., to the standard state). When the RFID tag is in the standard state, the RFID tag receives, processes, and responds to multiple different commands from an RFID reader. When the RFID tag is in the silent state, the RFID tag only responds to the awake command. The RFID tag may still receive commands while in the silent state, however, commands are not responded to except for the awake command.

In one or more embodiments, the RFID tag generates a silent key and transmits the silent key to the RFID reader in response to receiving the sleep command. Alternatively, the silent key is generated by a computing device or the RFID reader, and the silent key is included with the sleep command that is stored in memory of the RFID tag. The RFID reader provides the silent key to the RFID tag along with the awake command, allowing the RFID tag to verify that the awake command is for the RFID tag.

In one or more embodiments, an RFID tag is placed on or within a store item that stores point-of-sale information. Items are tracked using an electronic product code (EPC), which can be included as part of the RFID tag or be separate from the RFID tag. During checkout, a computer system, such as a point-of-sale system, utilizes an RFID reader to scan the RFID tag of the store item and retrieves the point-of-sale information. The point-of-sale system transmits a sales receipt to store in memory of the RFID tag, and then transmits a sleep command to the RFID tag to initiate a change in state of the RFID tag from the standard state to the silent state. A silent key is generated and transmitted to the point-of-sale system, and the silent key and the associated EPC of the store item can be stored in a database or backend system of a retailer. If the customer returns the purchased store item along with the RFID tag, then the point-of-sale system retrieves the EPC of the store item. The backend system identifies the silent key associated with the EPC, and the point-of-sale system transmits an awake command that includes the silent key. The RFID tag verifies the silent key and changes to the standard state if the silent key is authenticated. With the RFID tag restored back to the standard state, the point-of-sale system can then retrieve the sales receipt stored in the memory of the RFID tag and refund the store item. Additionally, the RFID tag may be reused when the RFID tag is restored back to the standard state. For example, if the item is subsequently sold to another customer, a sales receipt for the subsequent sale can be stored in the memory of the RFID tag, and the RFID tag can again be put in the silent state.

The RFID tag also optionally includes a security module that provides security to the RFID tag by only allowing authorized commands to be processed if a correct access password is provided with the commands. Additionally, the security module can be used to generate the silent key.

The silent RFID state and restore back techniques discussed herein provide fast and efficient techniques for purchasing and returning store items by utilizing RFID tags. Rather than requiring customers to keep a physical copy of the sales receipt of the store item, the sales receipt and other information is stored in the RFID tag during checkout. If the customer returns the purchased store item, then the sales receipt is easily obtained without causing any inconvenience to the customer. The RFID tag can be reused, thereby reducing costs and improving the efficiency of inventory control.

Although discussions of automating device testing using RFID techniques are included herein with reference to use in a retail store, it should be noted that these techniques can additionally or alternatively be implemented in other areas. For example, the techniques discussed herein can be used analogously in a factory or assembly line, or a customer service facility or repair shop as a way to store information associated with a manufactured item and prevent misuse by using the silent state of the RFID tag.

As used herein, the term "powered on" or the "powered-on state" indicates that an RFID tag is turned on and in an operational state (e.g., the standard state or silent state), and the term "powered off" or the "powered-off state" indicates that the RFID tag is turned off. The term "powered-up" or "power-up" is used to indicate that an RFID tag is in the process of turning-on, such as when the RFID tag is within a communication distance of an RFID reader that provides energy to turn on the RFID tag via radio frequency waves. After the RFID tag has "powered-up" from the "powered-off state", the RFID tag is in the "powered-on state". The term "powered-down" or "power-down" is used to indicate that a RFID tag is in the process of turning off, such as the RFID tag is outside the communication distance of the RFID reader that provides energy to the RFID tag via radio frequency waves. After the RFID tag has "powered-down" from the "powered-on state", the RFID tag is in the "powered-off state".

While features and concepts of silent RFID state and restore back can be implemented in any number of different devices, systems, environments, and/or configurations, embodiments of silent RFID state and restore back are described in the context of the following example devices, systems, and methods.

Figure 1:
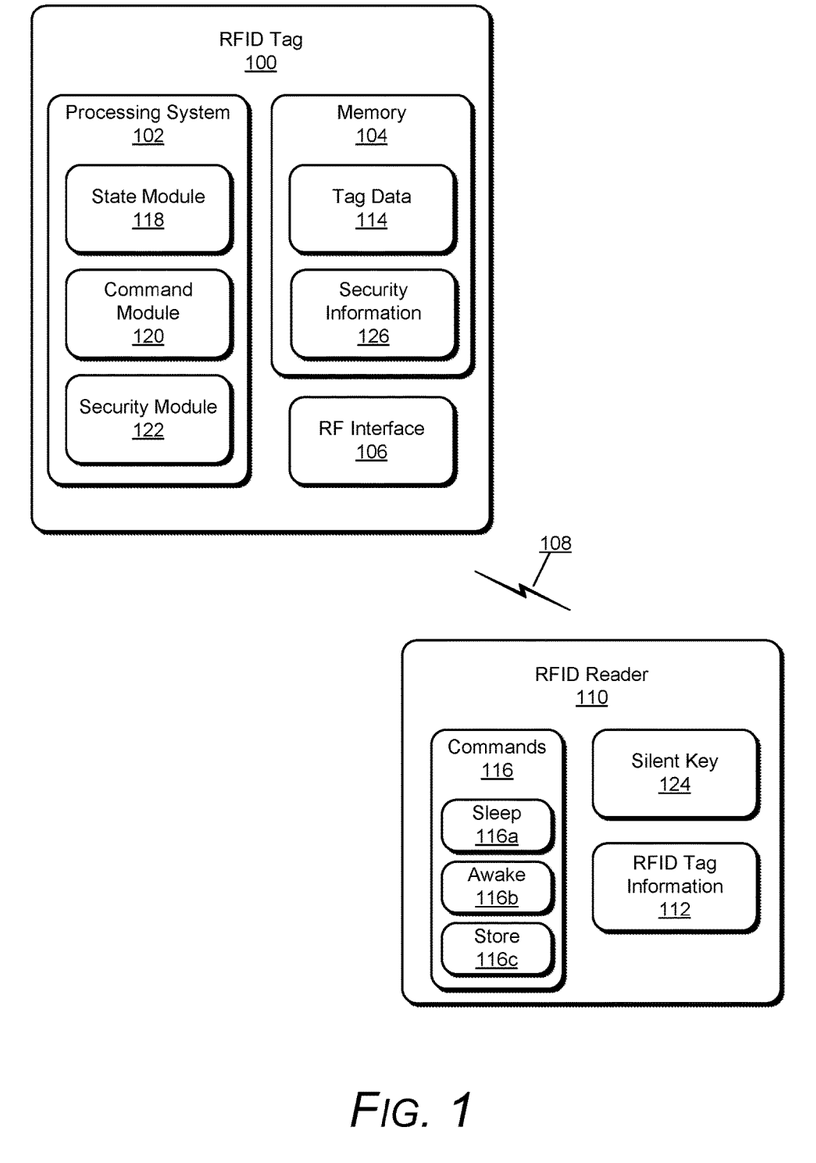
FIG. 1 illustrates an example RFID tag and RFID reader that can implement the silent RFID state and restore back in accordance with one or more embodiments.

FIG. 1 illustrates an example RFID tag and RFID reader that can implement the silent RFID state and restore back in accordance with one or more embodiments. The RFID tag 100 can be implemented with various components such as a processing system 102, a memory 104, an RF (radio frequency) interface 106, and any number and combination of various components as further described with reference to the example device shown in FIG. 7.

In this example, the RFID tag 100 implements components and features of the processing system 102, the memory 104, and the RF interface 106 that can be utilized for two-way wireless communication 108 with RFID readers, such as RFID reader 110. The RFID tag 100 is activated or powered-up in the presence of the RFID reader 110. Generally, RFID tags are small electronic tags or labels that can be programmed with identifying data or other information. The RFID reader 110 can transmit an interrogation signal as a broadcast message requesting RFID tags that are in range to return the identifying data or information that the RFID tags have stored. The RFID tags can then wirelessly communicate the data information to the RFID reader via an RF communication channel, which the RFID reader 110 receives as RFID tag information 112. Additionally, the RFID tag information 112 may include information to be stored in the RFID tag 100, and the RFID reader 110 can transmit the RFID tag information 112 to store in the memory 104 of the RFID tag 100 as tag data 114.

In implementations, the RFID tag 100 can include an ASIC/CPU module (e.g., processing system 102), as well as a transmitter and a receiver (or may be implemented as a transceiver) for two-way communication with the RFID reader 110. In response to receipt of a command, the ASIC/CPU module of the RFID tag processes the command, formulates a response that may include data from the RFID tag 100, and the response is wirelessly transmitted to the RFID reader 110. The response signals from the RFID tag 100 can be communicated using, for example, low frequency (LF), high frequency (HF), or ultra-high frequency (UHF) radio waves. The RFID tag data 114 can be stored in non-volatile memory, and the ASIC/CPU module can be implemented as fixed or programmable logic for processing the RFID tag data 114, as well as modulating and demodulating the RF signals. The RFID reader 110 receives the response signals from the RFID tag 100, and the response signals can include the data from the RFID tag 100. The response signal and data received by the RFID reader 110 can include information that the RFID tag 100 is storing, has obtained, is producing, and so forth. Further, the response signal and data received from an RFID tag 100 can include identification information, such as a code or an alphanumeric value, a parameter derived from a sensor including a sensor value, a parameter value, a descriptive indication, or some combination thereof.

As described herein, the RFID tag 100 receives a sleep command 116a from the RFID reader 110 to change to a silent state, which effectively makes the RFID tag unusable and unreadable. To restore back the RFID tag from the silent state, the RFID tag 110 receives an awake command 116b from the RFID reader 110 to change to the standard state.

In this example, the processing system 102 of RFID tag 100 includes state module 118, command module 120, and security module 122 to implement the silent RFID state and restore back. The state module 118, the command module 120, and the security module 122 can be implemented as a software application or module, such as computer-executable software instructions that are executable with a processor (e.g., with the processing system 102). As software applications, the state module 118, the command module 120, and the security module 122 can be stored on computer-readable storage memory (e.g., the device memory 104), such as any suitable memory device or electronic data storage implemented in the RFID tag 100.

In one or more embodiments, the memory 104 (e.g., non-volatile memory) of the RFID tag 100 can be accessed by the RFID reader 110 via an RF interface 106 and wireless communication 108 through the processing system 102 that communicates with the memory 104. For example, the command module 120 of the processing system 102 receives a command 116, such as a store command 116c, from the RFID reader 110 to store the RFID tag information 112 in the memory 104 of the RFID tag 100. Then the command module 120 stores the received RFID tag information 112 as tag data 114 in the memory 104 of the RFID tag 100. In implementations, the RFID tag information 112 to be stored in the memory 104 of the RFID tag 100 can include a silent key 124, which is stored as security information 126 in the memory 104 of the RFID tag 100.

In one or more embodiments, the state module 118 of processing system 102 is implemented to control operation of the RFID tag 100 in one of multiple states. The multiple states include a standard state (also referred to as a normal state), a silent state, and a killed state. The standard state is implemented to enable the RFID tag to receive, process, and respond to multiple different commands received from the RFID reader 110 (e.g., commands to store data to the RFID tag 100, commands to read data from the RFID tag 100, commands to change the state of the RFID tag 100 (e.g., to the silent state or the killed state), and so forth). The silent state is implemented to only enable the RFID tag 100 to respond to an awake command 116b. All other commands received are ignored by the RFID tag 100 while the RFID tag 100 is in the silent state. The killed state of the RFID tag 100 permanently disables the RFID tag such that the RFID tag is no longer reusable. Once in the killed state, the RFID tag 100 cannot be restored back to a different state.

In one or more embodiments, the command module 120 of processing system 102 is implemented to process and respond to commands received from the RFID reader 110. The command module 120 can communicate with the state module 118 of the processing system 102 to initiate state changes. Additionally, the command module 120 can communicate with the security module 122 to verify and authenticate commands and/or data received from the RFID reader 110. For example, a sleep command 116a is received by the RFID tag 100 from the RFID reader 110. In response to receipt of the sleep command 116a, the command module 120 communicates to the state module 118 to change the current state of the RFID tag 100 to a silent state.

In implementations, the state module 118 or the command module 120 can communicate to the security module 122 to generate security information 126 that includes a silent key to be stored in the memory 104 of the RFID tag. The silent key generated by the security module 122 is a password and can be communicated by the command module 120 to the RFID reader 110 as a response message to the sleep command 116a from the RFID reader 110. The RFID reader 110 receives the generated silent key as silent key 124 to be utilized with the awake command 116b. The silent key can be various sizes, such as a 64-bit key.

To restore back the RFID tag 100 to the standard state while the RFID tag is in the silent state, the command module 120 receives the awake command 116b from the RFID reader 110. As noted above, all other commands that are received from the RFID reader 110 are ignored by the RFID tag 100, and the other commands are not processed (other than to determine that they are to be ignored) and responses are not communicated to the RFID reader 110. The awake command 116b received by the RFID tag includes the silent key 124. The command module 120 communicates with the security module 122 to verify the silent key 124 received with the awake command 116b against the security information 126 in the memory 104 of the RFID tag 100. If the silent key is verified or authenticated (e.g., the received silent key matches or is the same as the silent key included in the security information 126), then the command module 120 communicates with the state module 118 to change from the silent state to the standard state.

Additionally or alternatively, the silent key can be generated by the RFID reader 110 or a computer system that utilizes the RFID reader 110 for communicating with the RFID tag 100. In such situations, rather than the security module 122 generating security information 126 that includes the silent key as discussed above, the RFID reader 110 communicates the silent key 124 to the RFID tag 100 (e.g., along with the sleep command 116a). In response to receipt of the sleep command 116a and the silent key 124, the command module 120 (or security module 122) stores the silent key 124 in the memory 104 of the RFID tag as security information 126.

In one or more embodiments, the RFID tag 100 includes a secured state that implements an access password to determine whether processing of commands received from the RFID reader 110 is allowed. The secured state can be included as part of (e.g., be a sub-state of) the standard state, or alternatively can be analogous to the secured state except for its use of an access password. The access password is stored in the security information 126 in the memory 104 of the RFID tag 100. When the RFID tag 100 is in the secured state, the security module 122 performs commands received from the RFID reader 110 if the RFID reader 110 sends an access password that is verified or authenticated (e.g., the access password received from the RFID reader 110 matches or is the same as the access password in the security information 126). If the RFID reader 110 sends an access password that is not verified or authenticated (e.g., the access password received from the RFID reader 110 does not match or is not the same as the access password in the security information 126), then the command module 120 does not perform the command received from the RFID reader 110.

For example, the command module 120 of the RFID tag 100 receives the sleep command 116a that includes the access password from the RFID reader 110. The command module 120 communicates with the security module 122 to verify the received access password included with the sleep command 116a from the RFID reader 110 against the access password stored in the security information 126 of the RFID tag 100. If the received access password included with the sleep command 116a is verified (e.g., the received access password matches or is the same as the access password in the security information 126), then the command module 120 continues to process the sleep command 116a as discussed above. If the received access password is not verified, then the command module 120 does not process the sleep command 116a.

Continuing with this example above, the command module 120 of the RFID tag 100 receives the awake command 116b that includes the silent key and the access password while the RFID tag 100 is in the silent state. The command module 120 communicates with the security module 122 to verify the received access password included with the awake command 116b against the access password stored in the security information 126 of the RFID tag 100. If the received access password included with the awake command 116b is verified or authenticated (e.g., the access password received from the RFID reader 110 matches or is the same as the access password in the memory 104), then the command module 120 continues to process the awake command 116b as discussed above. If the received access password is not verified (e.g., the access password received from the RFID reader 110 does not match or is not the same as the access password in the security information 126), then the command module 120 does not process the awake command 116b.

In one or more embodiments, a command structure or packet structure of the commands 116 received by the RFID tag 100 contain sufficient bits or bytes to include the access password and/or silent key for each of the commands 116. For example, the commands discussed above (e.g., store, awake, and sleep) each have a particular command structure size large enough to include the command, the access password, and/or the silent key. Alternatively, rather than the command structure or packet structure being of sufficient size to include the command, the access password, and/or the silent key, a communication protocol between the RFID tag and the RFID reader may support multiple commands or packets to communicate the command, the access password, and/or the silent key.

The access password and the silent key can have various different sizes. For example, the access password can have a size of 32 bits and the silent key can have a size of 64 bits. These sizes of the access password and the silent key, however, are not intended to be construed as a limitation, and various other sizes of the access password and/or the silent key can alternatively be used.

Although the state module 118, the command module 120, and the security module 122 are illustrated as different modules of the processing system 102 of the RFID tag 100, alternatively the functionality of the state module 118, the command module 120, and the security module 122 can be combined into fewer modules and/or further separated into additional modules.

Figure 2:
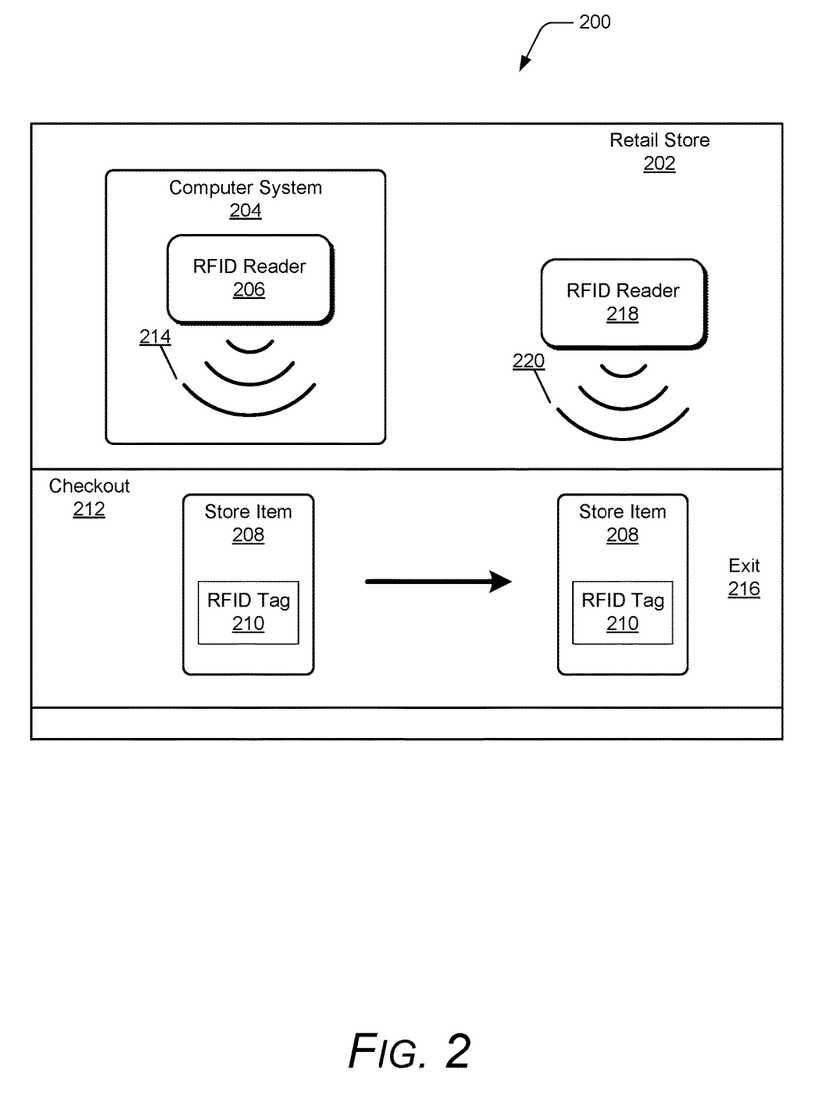
FIG. 2 further illustrates an example environment in which the silent RFID state and restore back can be implemented.

FIG. 2 illustrates an example environment in which the silent RFID state and restore back can be implemented. In this example, the environment 200 includes retail store 202 that contains a computer system 204 that includes an RFID reader 206 and store item 208. The store item 208 includes an RFID tag 210 that can be the RFID tag 100 shown in FIG. 1.

The environment 200 includes a checkout area (e.g., checkout 212) of the retail store 202 that utilizes the computer system 204 for purchasing the store item 208. In one or more embodiments, the computer system 204 utilizes the RFID reader 206 for two-way wireless communication 214 with the RFID tag 210 of the store item 208.

In implementations, the RFID tag 210 of the store item 208 can wirelessly communicate data to the RFID reader 206 via an RF communication channel in response to a scan or command from the RFID reader 206. For example, when the store item 208 arrives at checkout 212, the RFID reader 206 of the computer system 204 scans the store item 208 to power-up the RFID tag 210. The RFID tag receives information from the RFID reader 206 to store in memory of the RFID tag 210. The information can include information associated with the store item 208, such as a sales receipt, a model and serial number of the store item, customer information, and the like.

The RFID tag 210 then receives a sleep command from the RFID reader 206 and in response, the RFID tag 210 transmits a silent key to be stored in the computer system 204 or a backend system of the retail store 202. The RFID tag 210 changes to a silent state that is only responsive to an awake command that includes the silent key.

As the store items arrives near exit 216, RFID reader 218 continuously scans for RFID tags located on or within store items via wireless communication 220 that are within communication range. Stores items that have not been purchased will have RFID tags in the standard state that enables RFID readers (e.g., RFID reader 218) to detect RFID tags in the standard state at exit 216 of the retail store 202. RFID tags in the silent state will not respond to the RFID reader 218. For example, if the store item 208 did not go through checkout 212, then the RFID tag 210 of the store item 208 is still in the standard state because the store item was not purchased. When the store item 208 arrives at exit 216, the RFID reader 218 detects the store item 208 due to the RFID tag 210 being in the standard state (e.g., the RFID tag 210 responds to a scan or query command from the RFID reader 218). An appropriate responsive action can then be taken, such as sounding an alarm, recording the EPC of the store item 208, sending a notification or report, and so forth. In another example, if the store item 208 did go through checkout 212, then the RFID tag 210 is in the silent state because the store item was purchased. When the store item 208 arrives at exit 216, the RFID reader 218 does not detect the store item 208 due to the RFID tag 210 being in the silent state (the RFID tag 210 only responds to an awake command, which is not transmitted by the RFID reader 218).

The store item 208 can also be subsequently returned to the retail store 202 for a refund. The RFID tag 210 of the store item 208 is implemented to be in the silent state after purchasing the store item as discussed above. In order for the RFID tag 210 to exit the silent state and change to the standard state, the RFID tag 210 receives the awake command that includes the silent key associated with the RFID tag 210 from the RFID reader 206. If the RFID tag 210 verifies the silent key, then the RFID tag 210 changes from the silent state to the standard state. Additionally, the computer system 204 utilizing the RFID reader 206 can transmit a command to erase or delete previous information stored in the memory of the RFID tag 210. As noted above, the information stored in the memory of the RFID tag can be a sales receipt, which can be deleted upon return of the store item or a subsequent purchase of the store item.

The above discussion enables environment 200 to utilize RFID tags to store information and enter a silent mode to enable a security measure that does not allow the RFID tag to be read, altered, or reused except for an entity that has the silent key. Further, RFID tags can be implemented for an anti-theft device system by detecting unpurchased store items near the exit of the retail store.

Example methods 300, 400, 500, and 600 are described with reference to FIGS. 3-6 in accordance with implementations of the silent RFID state and restore back. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
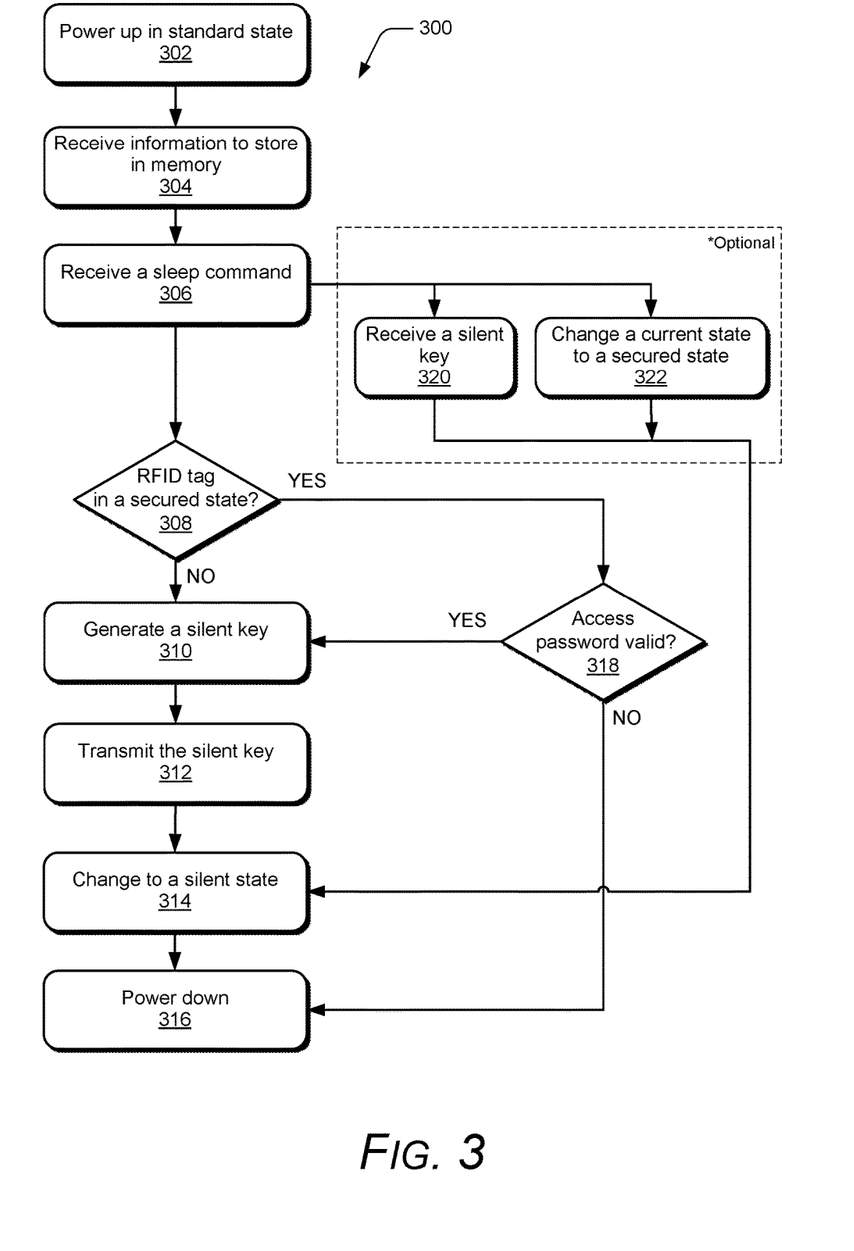
FIG. 3 illustrates an example method of implementing the silent RFID state and restore back in accordance with one or more embodiments.

FIG. 3 illustrates an example method 300 of implementing the silent RFID state and restore back in accordance with one or more embodiments. The method 300 is performed by an RFID tag, such as RFID tag 100 shown in FIG. 1 or RFID tag 210 shown in FIG. 2. The order in which the method is described is not intended to be construed as a limitation, and any number or combination of the described method operations can be performed in any order. The method 300 is discussed with additional reference to FIG. 1.

At 302, the RFID tag is powered-up in the standard state, and at 304 information to store in memory of the RFID tag is received. The information can be, for example, a silent key, a sales receipt, a model and serial number of associated with the RFID tag, customer information, and/or other information. For example, the RFID tag 100 can receive RFID tag information 112 from RFID reader 110 to store in memory 104 of the RFID tag 100 as tag data 114.

At 306, a sleep command is received. For example, the RFID tag 100 can receive a sleep command 116a from the RFID reader 110.

At 308, a determination is made as to whether the RFID tag is in the secured state. The secured state utilizes an access password that is required to be included with commands received by the RFID tag to allow the commands to be processed while the RFID tag is in the secured state. If the RFID tag is not in the secured state (i.e., "No" from 308), then the process proceeds to 310.

At 310 the RFID tag generates a silent key that is stored in the memory of the RFID tag, and at 312 the silent key can be transmitted. Continuing with the example above, in response to receipt of the sleep command 116a from the RFID reader 108, the processing system 102 can generate the silent key to be stored in the memory 104 of the RFID tag 100 and transmit the generated silent key as a response message to the sleep command to the RFID reader 110.

At 314, the current state of the RFID tag is changed to a silent state. For example, the processing system 102 of the RFID tag 100 can communicate with state module 118 to change the current state of the RFID tag 100 to the silent state. The process then ends at power down at 316.

Returning to 308, if the RFID tag is in the secured state, then at 318 a determination is made as to whether the access password included with the sleep command is valid. If the access password is valid (i.e., "Yes" from 318), then the process may proceed to generate the silent key at 310. If the access password is invalid (i.e., "No" from 318), then the process ends at power down at 316.

Optionally, at 320, a silent key is received and stored in the memory of the RFID tag. For example, the RFID tag 100 can receive silent key 124 from the RFID reader 110 to store in the memory 104 of the RFID tag 100 as security information 126. Thus, rather than the RFID tag 100 itself generating the silent key 124 and transmitting the silent key 124 to the RFID reader 110 (e.g., at 310 and 312), the silent key can be received from the RFID reader 110.

At 322, a command is optionally received that causes the RFID tag to change to the secured state that utilizes an access password.

After receipt of the silent key at 320 and/or changing the current state to the secured state at 322, the process proceeds to change the current state of the RFID tag to a silent state at 314 and then the process ends at power down at 316.

In one or more embodiments in which the RFID tag is not already in the secured state, the silent key is received at 320 and the state of the RFID tag is changed to a silent state at 314 in response to the sleep command received at 306. However, if the RFID tag is already in the secured state, then the state of the RFID tag is changed to a silent state at 314 in response to an access password received by the RFID tag being valid. If the access password is not valid, then the process ends at power down at 316 without having been changed to the silent state despite the silent key received at 320.

Figure 4:
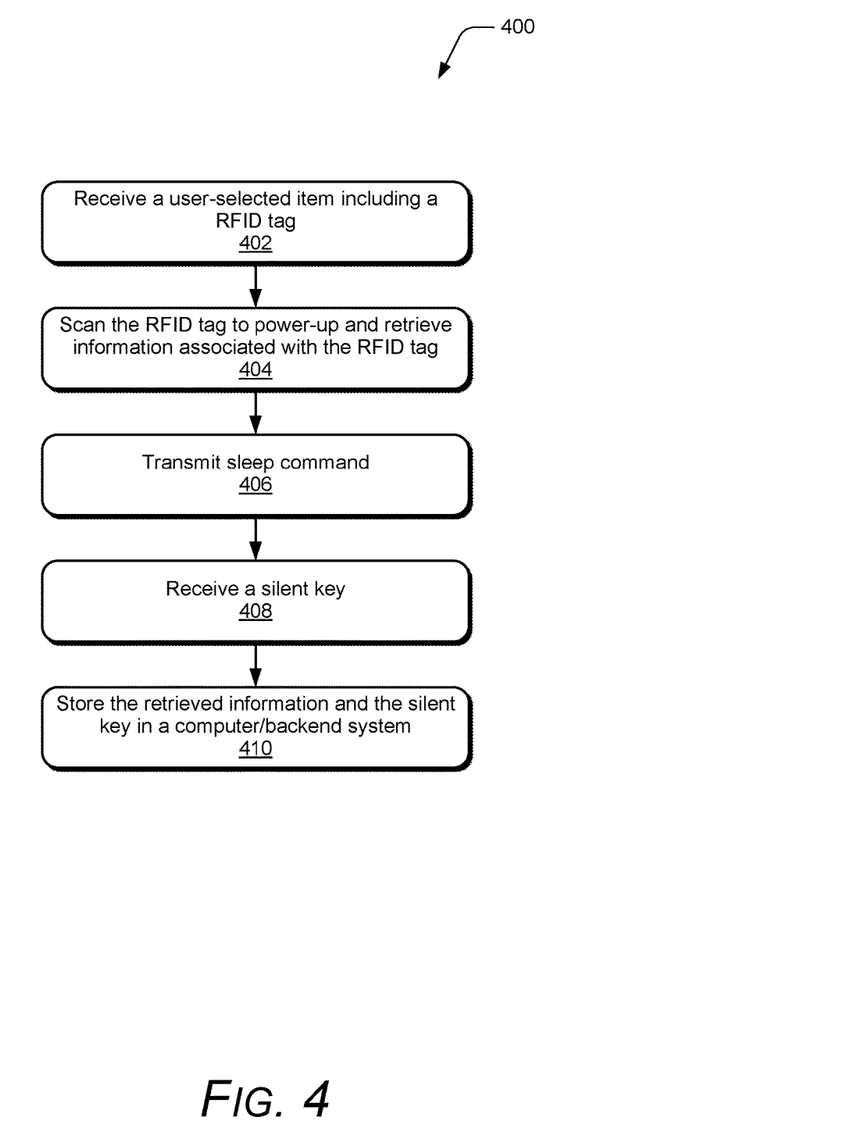
FIG. 4 illustrates another example method of implementing the silent RFID state and restore back in accordance with one or more embodiments.

FIG. 4 illustrates another example method 400 of implementing the silent RFID state and restore back in accordance with one or more embodiments. The method 400 is performed by a computer system that utilizes an RFID reader, such as computer system 204 and RFID reader 206 shown in FIG. 2. The order in which the method is described is not intended to be construed as a limitation, and any number or combination of the described method operations can be performed in any order. The method 400 is discussed with additional reference to FIG. 2.

At 402, a user-selected item that includes an RFID tag is received. The user-selected item can be, for instance, a retail store item such as store item 208 shown in FIG. 2. For example, the store item 208 is received by a cashier that uses computer system 204 at checkout 212.

At 404, the RFID tag of the user-selected item is scanned to power-up and retrieve information associated with the RFID tag. The information can include a unique identifier of the RFID tag, an electronic product code of the user-selected item, data stored in memory of the RFID tag, and the like. The scan to power-up and retrieve information associated with the RFID tag can be performed by, for example, the computer system 204 that utilizes the RFID reader 206.

At 406, a sleep command is transmitted to the RFID tag. The sleep command can be transmitted by, for example, the RFID reader 206 of the computer system 204. An access password can also optionally be transmitted to the RFID tag.

At 408, in response to the sleep command, a silent key is received by the RFID reader (e.g. RFID reader 206). Alternatively, the silent key can be transmitted to the RFID tag along with the sleep command at act 406, in which case the silent key is not received in act 408.

At 410, the retrieved information at 404 and the received silent at 408 are stored in a computer system or a backend system. For example, the computing system 204 can store the retrieved information and the silent key received from the RFID tag 210 in memory of the computing system 204 (e.g., non-volatile memory). The silent key is stored as associated with the RFID tag. This association can be maintained in various manners, such as a record, list, database, or other data structure mapping or otherwise maintaining a correspondence between silent keys and RFID tags. RFID tags can be identified in different manners, such as based on an EPC included as part of the RFID tag (e.g., stored as tag data 114), based on a bar code or other universal product code (UPC) displayed or printed on the store item 208 or the RFID tag 210, and so forth.

Figure 5:
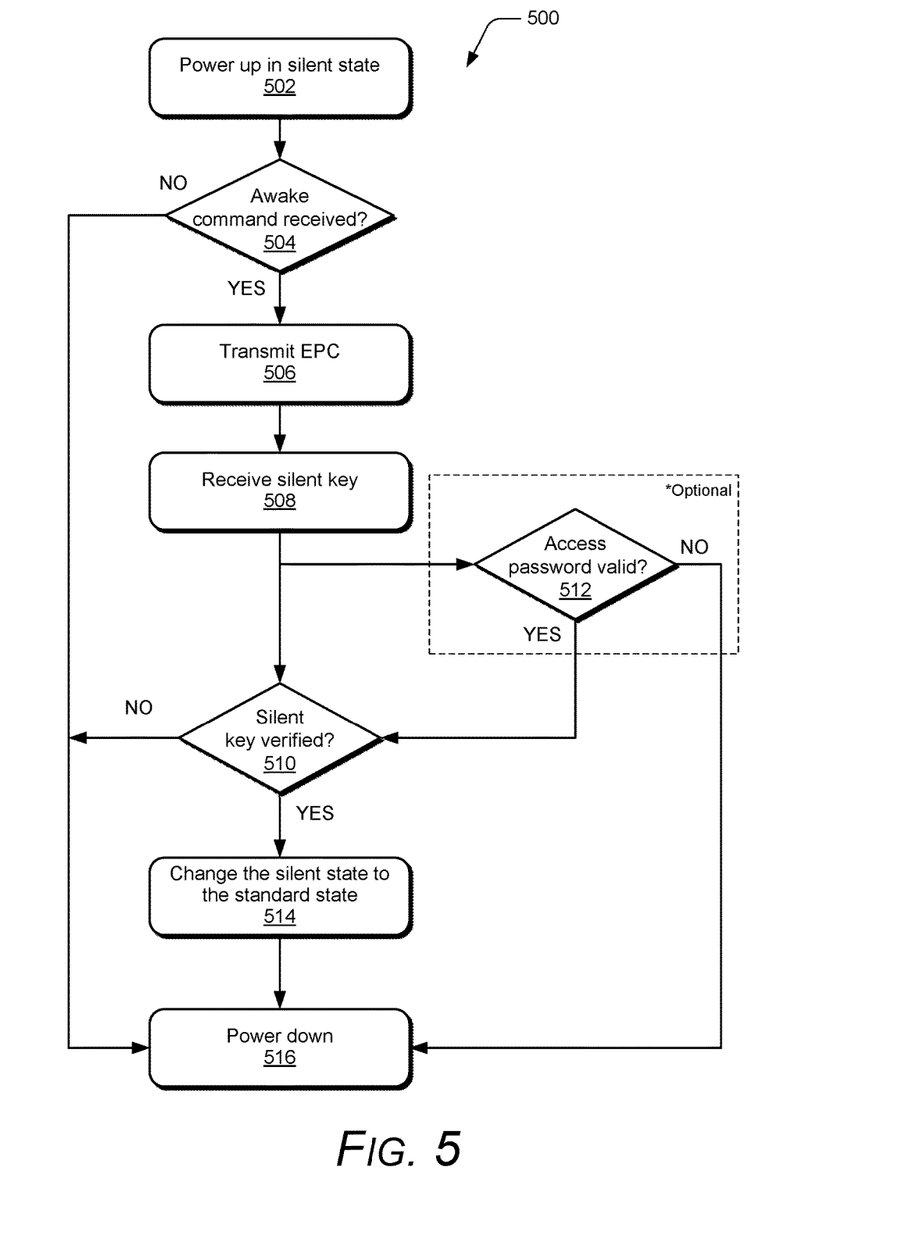
FIG. 5 illustrates another example method of implementing the silent RFID state and restore back in accordance with one or more embodiments.

FIG. 5 illustrates another example method 500 of implementing the silent RFID state and restore back in accordance with one or more embodiments. The method 500 is performed by a RFID tag, such as RFID tag 100 shown in FIG. 1 or RFID tag 210 shown in FIG. 2. The order in which the method is described is not intended to be construed as a limitation, and any number or combination of the described method operations can be performed in any order. The method 500 is discussed with additional reference to FIG. 1.

At 502, the RFID tag is powered-up in a silent state in response to a command from an RFID reader.

At 504, a determination is made as to whether the command from the RFID reader is an awake command. For example, the RFID tag 100 can receive an awake command 116b from RFID reader 110. In another example, the RFID tag 100 can receive the awake command 116b that includes silent key 124 from the RFID reader 110.

At 506, in response to determining that the received command is an awake command, an electronic product code (EPC) associated with the RFID tag is transmitted to the RFID reader. For example, the RFID tag 100 can transmit tag data 114 that includes the EPC to the RFID reader 110.

At 508, a silent key is received from the RFID reader. For example, the RFID tag 100 can receive silent key 124 from the RFID reader 110.

At 510, a determination is made as to whether the silent key is verified. The silent key can be verified by, for instance, the security module 122 shown in FIG. 1. For example, the security module 122 can verify or authenticate the received silent key against a silent key stored in security information 126 in the memory 104 of the RFID tag 100.

At 512, a determination is optionally made as to whether an access password included with the awake command is valid. As discussed above, if the RFID tag was placed in a secured state prior to changing to the silent state, then an access password is required for all subsequent commands.

At 514, in response to the silent key being verified and optionally the access password being valid, the silent state of the RFID tag is changed to the standard state. For example, the command module 120 processing the awake command received from the RFID reader 110 can communicate with state module 118 to change from the silent state to the standard state.

At 516, the process ends at power down of the RFID tag. The process can end in response to a command being received that is not an awake command, in response to the silent key received with an awake command not being verified, or in response to an access password received with an awake command not being validated.

Figure 6:
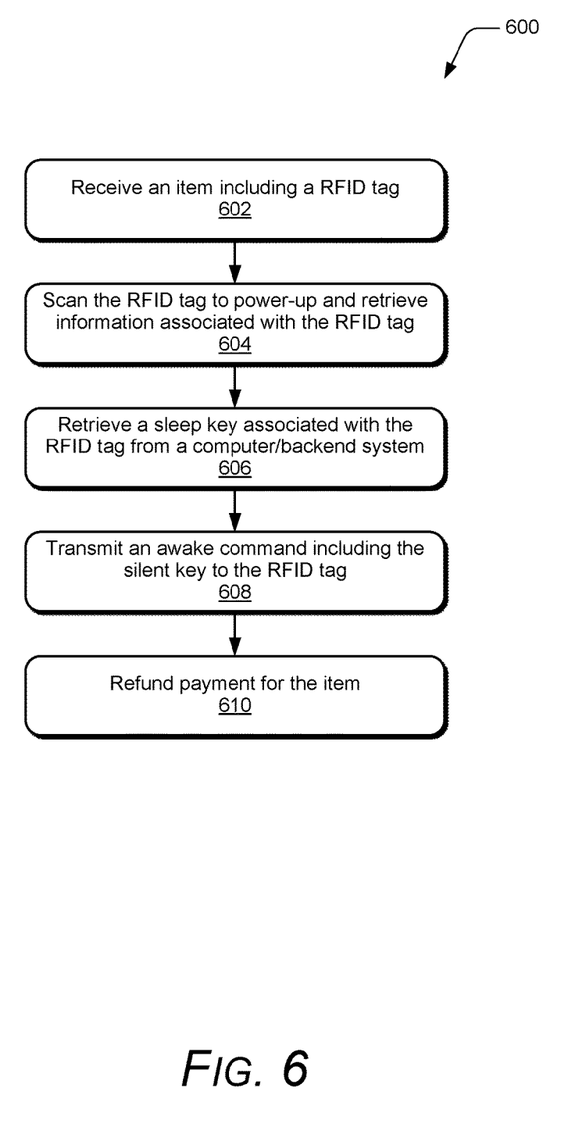
FIG. 6 illustrates another example method of implementing the silent RFID state and restore back in accordance with one or more embodiments.

FIG. 6 illustrates another example 600 of implementing the silent RFID state and restore back in accordance with one or more embodiments. The method 600 is performed by a computer system that utilizes an RFID reader, such as computer system 204 and RFID reader 206 shown in FIG. 2. The order in which the method is described is not intended to be construed as a limitation, and any number or combination of the described method operations can be performed in any order to perform a method, or an alternate method. The method 600 is discussed with additional reference to FIG. 2.

At 602, an item that includes an RFID tag in a silent state is received. The item can be, for instance, a retail store item such as store item 208 shown in FIG. 2. For example, the store item 208 is received by a cashier that uses computer system 204 at checkout 212.

At 604, the RFID tag of the item is scanned to power-up and retrieve information associated with the RFID tag. The information can include a unique identifier of the RFID tag, an electronic product code of the user-selected item, data stored in memory of the RFID tag, and the like. The scan to power-up and retrieve information associated with the RFID tag can be performed by, for example, the computer system 204 that utilizes the RFID reader 206.

At 606, a silent key associated with the RFID tag is retrieved from the computer system or a backend system. For example, the computer system 204 can retrieve the silent key associated with the RFID tag 210 of the store item 208 from memory of the computer system 204 or from a backend system. The proper silent key to retrieve can be determined in various manners, such as based on an EPC associated with the RFID tag. The EPC can be included as part of the RFID tag, can be a bar code or other UPC displayed or printed on the store item 208, and so forth.

At 608, an awake command including the silent key is transmitted to the RFID tag of the item to restore back the RFID tag to the standard state from the silent state. For example, the RFID reader 206 of computer system 204 can transmit the awake command to the RFID tag 210 of the store item 208. An access password can also optionally be transmitted to the RFID tag 210 along with the awake command.

At 610, payment for the item is refunded to the customer that purchased the item.

Figure 7:
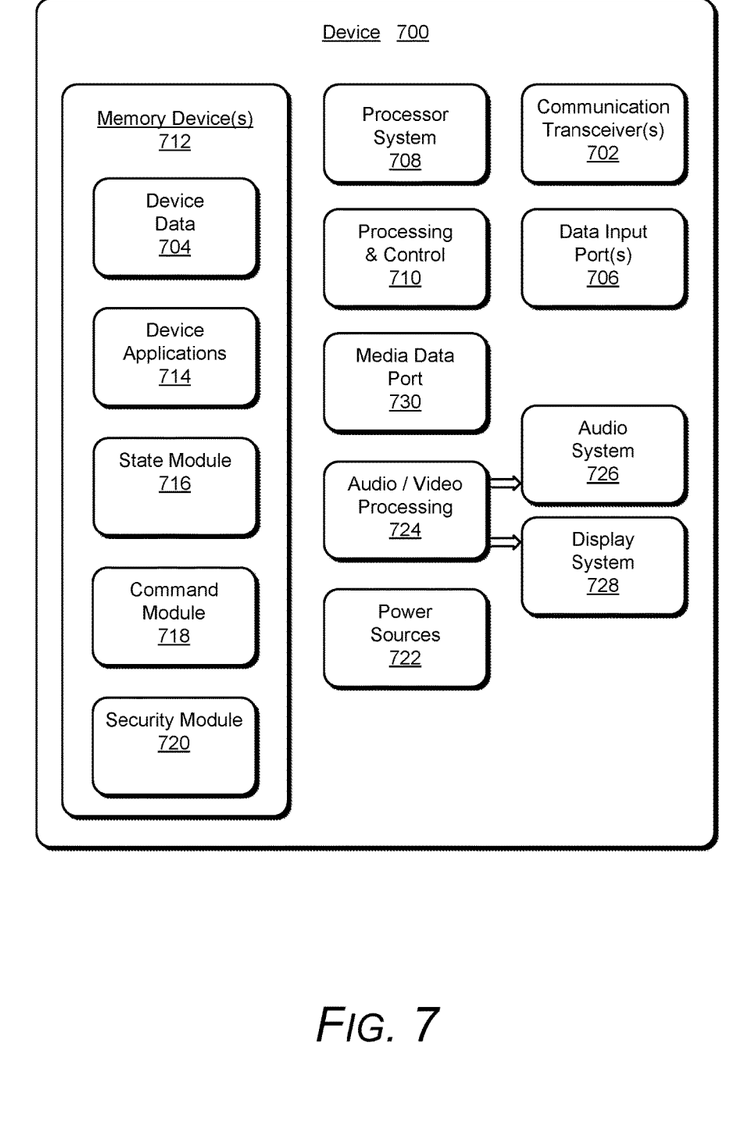
FIG. 7 illustrates various components of an example device that can implement embodiments of the silent RFID state and restore back.

FIG. 7 illustrates various components of an example device 700 in which embodiments of the silent RFID state and restore back can be implemented. The example device 700 can be implemented as any of the computing devices described with reference to the previous FIGS. 1-6, such as any type of client device, mobile phone, tablet, computing, communication, entertainment, gaming, media playback, and/or other type of device. For example, the RFID tag 100 shown in FIG. 1, the RFID tag 210, and the computer system 204 may be implemented as the example device 700.

The device 700 includes communication transceivers 702 that enable wired and/or wireless communication of device data 704 with other devices, such as the tag data 114 and security information 126 as described with reference to the RFID tag 100 shown in FIG. 1. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 700 may also include one or more data input ports 706 via which any type of data, media content, and/or inputs can be received, such as user selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processing system 708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory 712 that enable data storage, such as data storage devices that can be accessed by a computing device, and that provide persistent storage of data and executable instructions (e.g., software applications, programs, functions, and the like). Examples of the computer-readable storage memory 712 include volatile memory and non-volatile memory, fixed and removable media devices, and any suitable memory device or electronic data storage that maintains data for computing device access. The computer-readable storage memory can include various implementations of random access memory (RAM), read only memory (ROM), flash memory, and other types of storage media in various memory device configurations. The device 700 may also include a mass storage media device.

The computer-readable storage memory 712 provides data storage mechanisms to store the device data 704, other types of information and/or data, and various device applications 714 (e.g., software applications). For example, a state module 716 can be maintained as software instructions with a memory device and executed by the processing system 708. The device applications may also include a device manager, such as any form of a control application, software application, signal-processing and control module, code that is native to a particular device, a hardware abstraction layer for a particular device, and so on. In this example, the device 700 includes a command module 718 that implements embodiments of silent RFID state and restore back, and may be implemented with hardware components and/or in software, such as when the device 700 is implemented as at least part of the RFID tag 100 or RFID tag 210 described with reference to FIGS. 1-2. An example of the command module 718 is the command module 120.

The device 700 also includes security module 720, such as described with reference to the security module 122 implemented in the RFID tag 100. The device 700 can also include one or more power sources 722, such as when the device is implemented as a mobile device or a computing device. The power sources may include a charging and/or power system, and can be implemented as a flexible strip battery, a rechargeable battery, a charged super-capacitor, and/or any other type of active or passive power source.

The device 700 also includes an audio and/or video processing system 724 that generates audio data for an audio system 726 and/or generates display data for a display system 728. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 730. In implementations, the audio system and/or the display system are integrated components of the example device. Alternatively, the audio system and/or the display system are external, peripheral components to the example device.

Although embodiments of silent RFID state and restore back have been described in language specific to features and/or methods, the subject of the appended claims is not necessarily limited to the specific features or methods described. Rather, the specific features and methods are disclosed as example implementations of silent RFID state and restore back, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method implemented in a radio frequency identification (RFID) tag, the method comprising:
    receiving, from an RFID reader, a sleep command;
    generating a silent key responsive to receipt of the sleep command;
    transmitting the silent key to the RFID reader subsequent to the generating of the silent key;
    changing the RFID tag from a standard state to a silent state responsive to receipt of the sleep command, the standard state configured to respond to commands from the RFID reader, the silent state configured to only respond to an awake command from the RFID reader;
    receiving, from the RFID reader, the awake command and the silent key while the RFID tag is in the silent state; and
    changing the RFID tag from the silent state to the standard state responsive to processing the awake command with the silent key, the processing the awake command comprising verifying the silent key received by the RFID reader against the silent key generated by the RFID tag prior to changing the silent state of the RFID tag to the standard state.

2. The method as recited in claim 1, further comprising:
    receiving a command that causes the RFID tag to change to a secured state that utilizes an access password to determine whether processing of the commands is allowed for subsequent commands.

3. The method as recited in claim 2, wherein the receiving the sleep command comprises receiving the sleep command that includes the access password while the RFID tag is in the secured state, and the method further comprising:
    determining whether the access password is valid; and
    the changing the RFID tag from the standard state to the silent state comprising changing to the silent state only if the access password is valid.

4. The method as recited in claim 1, further comprising:
    ignoring commands received from the RFID reader except for the awake command while the RFID tag is in the silent state.

5. The method as recited in claim 1, further comprising:
    receiving information from the RFID reader to store in memory of the RFID tag; and
    storing the information received from the RFID reader in the memory of the RFID tag.

6. The method as recited in claim 1, further comprising:
    storing the silent key in memory of the RFID tag to be used for the processing the awake command.

7. The method as recited in claim 1, further comprising:
    receiving from the RFID reader, after receipt of the awake command, an additional sleep command; and
    changing the RFID tag from the standard state to the silent state responsive to receipt of the additional sleep command.

8. A radio frequency identification (RFID) tag, comprising:
    a processing system; and
    a memory including executable instructions that, responsive to execution by the processing system, cause the processing system to:
    receive a sleep command from an RFID reader while the RFID tag is in a standard state, the standard state configured to respond to commands from the RFID reader;
    generate a silent key responsive to the receipt of the sleep command;
    transmit the silent key to the RFID reader subsequent to the generation of the silent key;
    change the RFID tag from the standard state to a silent state responsive to receipt of the sleep command, the silent state configured to only respond to an awake command;
    receive the awake command from the RFID reader while the RFID tag is in the silent state, the awake command including the silent key; and
    change the RFID tag from the silent state to the standard state responsive to the awake command being processed, the processing the awake command including verifying the silent key included with the awake command against the silent key generated by the RFID tag.

9. The RFID tag as recited in claim 8, the executable instructions further causing the processing system to:
    receive a command that causes the RFID tag to change to a secured state that utilizes an access password to determine whether processing of the commands is allowed for subsequent commands.

10. The RFID tag as recited in claim 9, wherein to receive the sleep command includes to receive the sleep command including the access password while the RFID tag is in the secured state, and the executable instructions further causing the processing system to:
    determine whether the access password is valid; and
    wherein to change the RFID tag from the standard state to the silent state is to change the RFID tag from the standard state to the silent state only if the access password is valid.

11. The RFID tag as recited in claim 8, the executable instructions further causing the processing system to:

ignore commands received from the RFID reader except for the awake command while the RFID tag is in the silent state.

12. The RFID tag as recited in claim 8, the executable instructions further causing the processing system to:
receive information from the RFID reader to store in the RFID tag; and
store the received information in the memory.

13. The RFID tag as recited in claim 8, the executable instructions further causing the processing system to:
receive from the RFID reader, after receipt of the awake command, an additional sleep command; and
change the RFID tag from the standard state to the silent state responsive to receipt of the additional sleep command.

14. The RFID tag as recited in claim 8, the executable instructions further causing the processing system to:
store the silent key in the memory of the RFID tag to be used for the processing the awake command.

15. The RFID tag as recited in claim 10, wherein the determine whether the access password is valid being performed prior to processing the sleep command, and the executable instructions further causing the processing system to:
ignore the processing of the sleep command if the access password is invalid.

16. A system comprising:
a radio frequency identification (RFID) reader;
an RFID tag comprising a processing system and a memory including executable instructions that, responsive to execution by the processing system, cause the processing system to:
receive a sleep command from the RFID reader while the RFID tag is in a standard state, the standard state enabling the RFID tag to respond to commands from the RFID reader, the silent state enabling the RFID tag to only respond to an awake command;
generate a silent key responsive to the receipt of the sleep command;
transmit the silent key to the RFID reader subsequent to the generation of the silent key;
change the RFID tag from the standard state to a silent state responsive to receipt of the sleep command;
receive the awake command from the RFID reader while the RFID tag is in the silent state, the awake command including the silent key; and
change the RFID tag from the silent state to the standard state responsive to verifying the silent key, the verifying the silent key comprising verifying the silent key included with the awake command against the silent key generated by the RFID tag.

17. The system as recited in claim 16, the executable instructions further causing the processing system to:
receive information from the RFID reader to store in the memory of the RFID tag; and
store the received information in the memory of the RFID tag.

18. The system as recited in claim 16, the executable instructions further causing the processing system to:
store the silent key in the memory of the RFID tag.

19. The system as recited in claim 16, the executable instructions further causing the processing system to:
receive a command that causes the RFID tag to change to a secured state that utilizes an access password to determine whether processing of the commands is allowed for subsequent commands.

20. The system as recited in claim 19, wherein the receive the sleep command includes to receive the sleep command that includes the access password while the RFID tag is in the secured state, and the executable instructions further causing the processing system to:
determine whether the access password is valid; and
wherein to change the RFID tag from the standard state to the silent state includes to change the RFID tag from the standard state to the silent state only if the access password is valid.

* * * * *